United States Patent
Beatenbough et al.

[11] 3,858,564
[45] Jan. 7, 1975

[54] HEATED MANIFOLD WITH IMPROVED FUEL RETAINER

[75] Inventors: Paul K. Beatenbough, Medina; Alan F. Stocker, North Tonawanda, both of N.Y.

[73] Assignee: General Motors Corporation, Detroit, Mich.

[22] Filed: Oct. 31, 1973

[21] Appl. No.: 411,229

[52] U.S. Cl... 123/122 AB, 123/52 MV, 123/122 A
[51] Int. Cl............................................ F02m 31/00
[58] Field of Search... 123/122 R, 122 AC, 122 AB, 123/52 MV, 133; 165/52

[56] References Cited
UNITED STATES PATENTS

| | | | |
|---|---|---|---|
| 2,259,480 | 10/1941 | Morris | 123/122 AB |
| 3,625,190 | 12/1971 | Borssevain | 123/122 AC |
| 3,780,715 | 12/1973 | Futz | 123/122 AB |

FOREIGN PATENTS OR APPLICATIONS

| | | | |
|---|---|---|---|
| 697,308 | 9/1953 | Great Britain | 123/52 MV |

Primary Examiner—Charles J. Myhre
Assistant Examiner—R. H. Lazarus
Attorney, Agent, or Firm—J. C. Evans

[57] ABSTRACT

A quick heat manifold having a vertical riser bore adapted to be connected to a carburetor for supplying air-fuel mixture to engine cylinders includes an improved heat exchanger including a thin sheet metal heat transfer plate of thermally conductive material closing an opening in the floor of the induction plenum of the manifold above an exhaust heat crossover passage. A plurality of corrugated fin segments define a plurality of separate exhaust flow passes in communication with the exhaust crossover passage for quickly heating the plate during a cold engine start phase of operation. A fuel retainer on the inlet face of the plate includes a plurality of deformed segments thereon defining a plurality of separate cells that prevent blow-off of fuel droplets impinged thereagainst. The retainer is bonded to the plate and is configured to allow the temperature increases of the plate so that fuel droplets impinged thereagainst will vaporize upon contact with the retainer or plate to prevent fuel droplet accumulation on the plate.

3 Claims, 7 Drawing Figures

Patented Jan. 7, 1975

HEATED MANIFOLD WITH IMPROVED FUEL RETAINER

This invention relates to quick heat intake manifolds and more particularly to quick heat manifolds having a thin heat transfer plate interposed between an induction passage and an exhaust crossover passage for evaporating liquid fuel droplets during cold engine start.

Quick heat manifolds have utilized a finned plate hot spot between the exhaust and intake manifold which evaporates liquid components of the air-fuel mixture to the engine during cold engine start. Such plates are configured so that heat transfer to the inlet mixture is restricted and localized to reduce heating and expansion of the mixture which may lower the volumetric efficiency of the engine to reduce its power output. A plate of this type is set forth in the June 1944 issue of "Automobile Engineer" on page 254. Such plates are configured to form a well to accumulate fuel droplets and to maintain them in heat transfer contact with the plate so that they will boil off and eventually pass to the engine cylinders. Another approach is to provide a manifold having a hot spot therein defined by a plate between the inlet side of the manifold and an exhaust heat crossover passage wherein a nest of thin metal fins are provided on the inlet side of the plate to collect the liquid fuel components in the intake manifold. Liquid particles are accumulated on the nest of thin metal fins. The fins are sufficiently close together so that the liquid components are drawn by capillary action into heat transfer contact with the plates and evaporated therefrom. The fins on such plates are configured to produce a thin liquid layer on the hot spot which serves to thermally insulate the intake air-fuel mixture from the hot spot while separating the liquid fuel droplets so that they will vaporize prior to passage into the engine cylinders. A system of this type is set forth in the Mar. 2, 1922 issue of The Automobile at pages 516 and 517.

Other quick heat manifolds also include integral casting components thereon having a casting wall formed between an intake passage and an exhaust passage with integral fins being formed in the casting wall for improving transfer of exhaust heat through the wall and a plurality of ribs and baffles on the inlet side of the wall to accumulate liquid fuel droplets thereagainst during cold start operation so that they will evaporate prior to passage into the cylinders of the engine. An example of an integral casting having such fin configuration thereon is illustrated in the July 17, 1919 issue of "Automotive Industries" -The Automobile at pages 110-114 in an article entitled "Plan to Use Exhaust Heat in Vaporization of Low Grade Fuels" by F. C. Mock.

Manifolds having an integral casting with fins formed thereon to improve heat transfer from an exhaust passage to the integrally cast wall and fins for collecting fuels thereon have a reduced response time following cold engine start whereby fuel droplets will collect in the inlet manifold and pass into the engine cylinders in cases where carburetors have been modified to meet modern day emissions control standards.

Likewise, in cases where a capillary type screen or fin barrier is provided between the heat transfer plate and the induction air-fuel mixture to trap liquid fuel droplets it is found that under cold start conditions, the liquid droplet accumulation on the barrier can result in fuel starvation at the engine cylinder when the car is quickly accelerated.

An object of the present invention is to provide an improved heat exchanger assembly in a quick heat manifold wherein the component parts are easily assembled and result in a hot spot configuration that will prevent blow-off of fuel droplets from a heat transfer plate without accumulation of the fuel droplets on the hot spot during a cold start phase of operation.

Another object of the present invention is to provide a compact easily assembled heat exchanger in a quick heat manifold that seals an opening in an intake plenum floor including a flat sheet metal heat transfer plate component and a deformed metal retainer surface thereon to prevent blow-off of fuel droplets from the plate during cold engine startup with the retainer being bonded to the heat transfer plate to prevent cold spots thereon for collection of fuel droplets during engine start operation and wherein a corrugated sheet metal fin is connected to the opposite side of the plate and communicated with exhaust crossover passageways to quickly heat the plate and retainer to an elevated temperature whereby fuel droplets impinged thereagainst will evaporate immediately to maintain fuel supply to the engine cylinders in a vapor form.

Still another object of the present invention is to provide an improved quick heat engine manifold of the type including an induction plenum having a floor opening therein and including exhaust crossover passageways wherein a sandwiched heat exchanger construction closes the floor opening of the intake plenum and includes a thin metal heat conductive plate component and a retainer element with deformed components thereon partially bonded to the plate and separated from one another to form a plurality of interruptions on the intake face of the plate to prevent blow-off of liquid fuel droplets during engine start to produce positive fuel flow without accumulation on the plate and wherein the opposite face of the plate has a corrugated fin brazed thereto to form a plurality of exhaust flow passes in communication with the exhaust crossover passage.

Still another object of the present invention is to improve quick heat manifolds by the provision therein of a thin sheet metal hot plate interposed between an induction plenum and an exhaust crossover passage; the plate having a retainer element bonded to the inlet side thereof with thermally conductive material and wherein the retainer is formed by a plurality of deformed segments having a total vertical height not in excess of 2 to 3 times the thickness of the thin plate to define a barrier on the plate that will prevent blow-off of liquid droplets from the plate during a cold engine start phase of operation with all segments of the retainer being heated by the plate to a temperature that will evaporate fuel droplets contacting any given portion of the retainer so as to cause fuel droplets to immediately vaporize and pass into the engine cylinders to prevent fuel starvation at the cylinders.

Further objects and advantages of the invention will be apparent from the following description, reference being had to the accompanying drawings wherein a preferred embodiment of the present invention is clearly shown.

Figure 1:
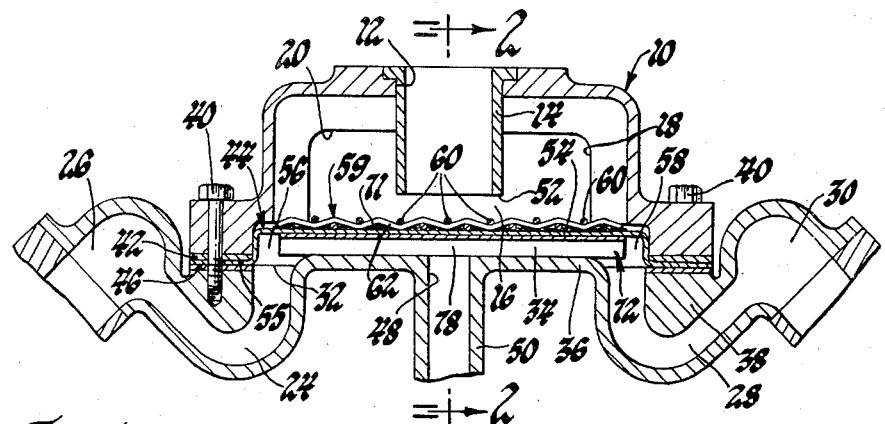
FIG. 1 is a vertical sectional view of an inlet manifold including the present invention.
Figure 2:
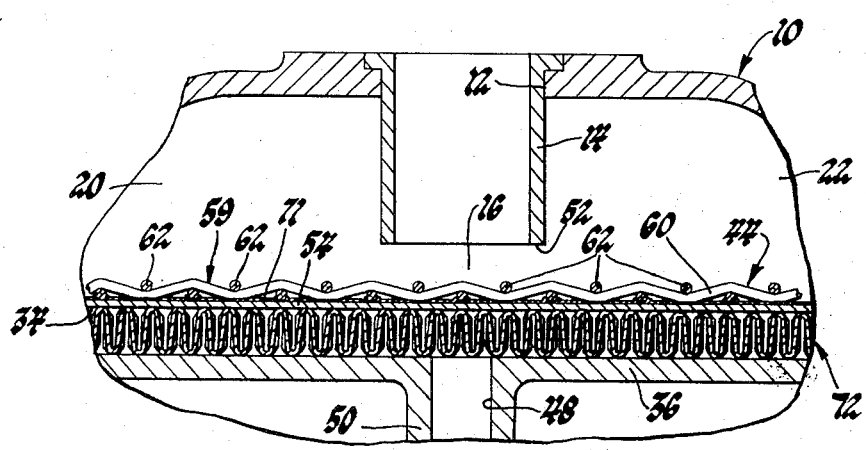
FIG. 2 is an enlarged vertical sectional view taken along the line 2—2 of FIG. 1 looking in the direction of the arrows.
Figure 3:
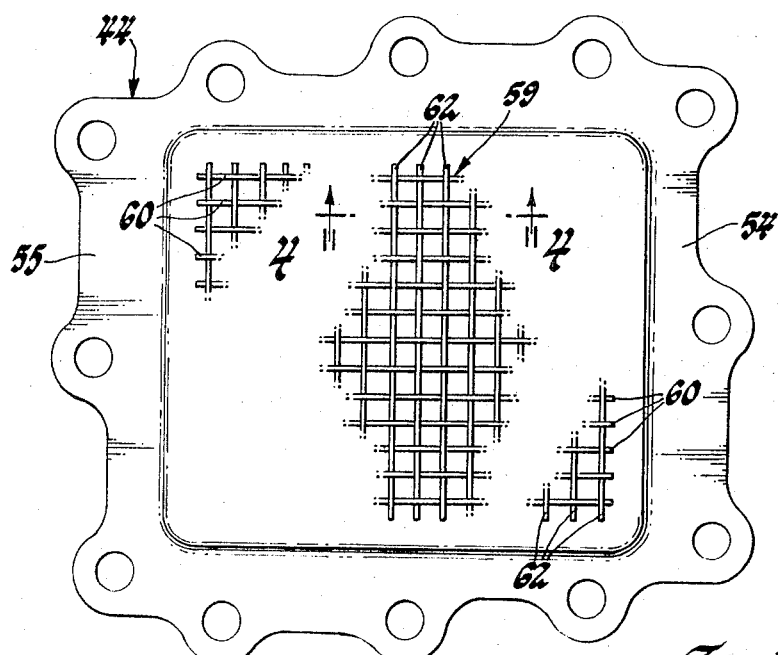
FIG. 3 is a top elevational view of an improved heat exchanger assembly constructed in accordance with the present invention.

Referring first to FIGS. 1 and 2, an intake manifold 10 is illustrated including a vertical riser bore 12 with a riser tube 14 supported therein. The tube 14 opens to a first portion 16 of an intake plenum 18 connected forwardly (leftwardly as viewed in FIG. 2) to a transverse runner 20 and connected rearwardly (rightwardly as viewed in FIG. 2) to a transverse runner 22.

The intake manifold includes an exhaust crossover passage 24 having an inlet port 26 thereto adapted to be connected to the exhaust manifold of one bank of cylinders of a V-8 engine. It further includes an exhaust crossover passage 28 that has an inlet port 30 connected to the exhaust manifold of a second bank of engine cylinders. The passage 24 has a port 32 thereon in communication with an exhaust crossover passage 34 formed between a cast iron cover 36 having a peripheral flange 38 thereon secured to the underside of the intake manifold 10 by a plurality of spaced apart bolts 40. The cover 36 is sealed with respect to the intake manifold by a gasket 42 and with respect to a heat exchanger plate 44 at the outer periphery thereof by means of an annular gasket 46. An outlet port 48 in the casting communicates the exhaust crossover passage 34 with an exhaust pipe 50 therein that is adapted to be connected to conventional exhaust and tailpipe components.

In accordance with certain principles of the present invention, the riser tube 14 has a lower edge 52 thereon located above the upper surface of the heat exchanger 44 so as to directly impinge the air-fuel mixture passing therethrough against the upper side of the exchanger 44.

The exchanger 44 more particularly includes a thin sheet metal hot plate 54 with openings 56, 58 on each side thereof which communicate with the exhaust crossover passage 34. Accordingly, exhaust heat from eight cylinders will be directed through the exhaust passages 24, 28 thence through the openings 56, 58, the crossover passage 34 and port 48 to be discharged through the exhaust pipe 50 connected to the vehicle exhaust system. In one working embodiment of the present invention, the thin heat metal conductive plate 54 is a plate 0.023 inch thick of chromized steel with a downwardly bent flange 55 held between gaskets 42, 46. This thickness of plate is the minimum required to withstand the pressure differential between the induction plenum 18 and the exhaust crossover passage 34. It also enables the heat exchanger 44 to be quickly elevated to a temperature in the range of 400°F. a short time period following cold engine start.

Figure 4:
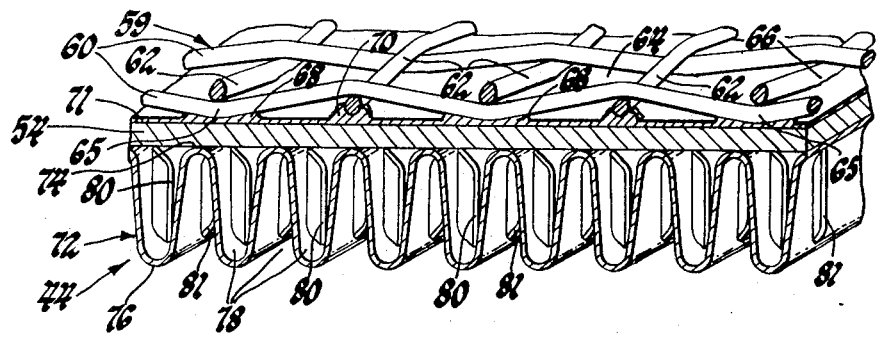
FIG. 4 is an enlarged vertical sectional view taken along the line 4—4 of FIG. 3 looking in the direction of the arrows.

In the embodiment of FIGS. 1 thru 4, the thin heat conductive metal plate 54 has a fuel retainer 59 on the inlet surface thereof which extends across the full planar extent of the plate 54. It is in the form of a stainless steel 4 × 4 wire mesh of 0.035 inch diameter wire strands 60 running longitudinally of the plate and 0.035 inch diameter wire strands 62 running transverse to the strands 60. As is best illustrated in FIG. 4, each of the strands 60 is woven with respect to the strands 62 to form a plurality of shallow cells or pockets 64, across the upper surface of the plate 54. Each of the pockets 64 is dimensioned to prevent any capillary action in cases where a fuel droplet might drop into the pocket 64 from the vertical riser bore 14 during cold engine start. This prevents accumulation of liquid droplets on the plate 54 during cold engine start and retains a substantial surface area of the plate 54 in exposed relationship with the air-fuel flow being impinged thereagainst at the lower end 52 of the riser tube 14. The woven strands 60, 62 of the wire mesh each include a plurality of spaced apart bent segments 65, 66 thereon which are in engagement with the inner surface of the plate 54. Each of these bent segments 65, 66 have a portion thereon secured to the plate by an accumulated segment 68, 70 respectively, of a layer 71 of conductive brazing material respectively that partially dam direct inner communication between each of the pockets 64 whereby the strands 60, 62 forming the walls of the pockets 64 and the brazed segments thereon will isolate each of the pockets 64 from one another so that liquid droplets impinged against the upper surface of the plate 54 will be retained at the point of impingement and will not be blown toward the outer edges of the plate 54 to accumulate thereon.

In the embodiment illustrated in FIGS. 1 thru 4, the wire or screen retainer 59 is bonded to the inner surface of the plate 54 by a method which includes locating braze alloy in the form of 0.003 inch copper foil between the mesh 59 and the plate 54. The screen mesh retainer 59 is fixtured against the surface of plate 54 with a compressive force of 0.16 lbs./sq. in. Then the fixtured mesh, foil and plate are heated to a braze temperature of 2050°f. in the absence of an atmosphere. The braze alloy melts and flows to the mating components to form a bonded assembly wherein the mesh is held closely against the plate to define an interrupted retainer surface on the plate.

The retainer 59 is also firmly secured thereby against the inner surface of the plate at a plurality of spaced apart points on the mesh. By use of the method approximately 75 percent of the contact points of the mesh and plate are bonded together. This connection of the wire mesh to the plate is by means of a compound having a thermal conductivity greater than that of the plate. This will cause the strands 60, 62 of the mesh to have an operating temperature closely proximate to that of the operating temperature of the plate. Accordingly, during a cold start phase of operation, as the plate 54 is rapidly increased in temperature by the exhaust flow, the strands 60, 62 of the mesh will also rapidly increase in temperature. As a result, the total exchanger surface on the inlet side thereof will have an elevated temperature which will cause liquid droplets impinged thereagainst to evaporate equally from the exposed surface of the plate 54 and from the wire strands 60, 62 bonded thereto. The wire mesh retainer 59 is further characterized by the physical dimensions of each of the strands and the woven configuration thereof which results in a total vertical height of the wire mesh with respect to the plate approximately 3 times the thickness of the plate 54 in cases where the plate 54 is selected to have a minimum thickness required for withstanding the pressure differential thereacross as set forth above. As a result, no portions of the retainer 59 are separated from the plate by a distance which will allow the retainer to have cold spots thereon on which liquid particles can condense during the cold start phase of operation. As a result, liquid droplets that are formed in the air-fuel mixture during engine start, once impinged against the retainer 59 and plate 54 will quickly evaporate for flow into the engine cylinders thereby to prevent any fuel starvation of the cylinders during the cold start phase of operation. The strands 60, 62 of the wire mesh, however, also serve to prevent a fuel droplet impinged thereagainst from blowing off the plate and accumulating in a liquid pocket which might result in fuel starvation at the cylinders.

The heat transfer from exhaust crossover passage 34 to plate 54 is improved by provision of a corrugated fin 72 having reverse bends 74, 76 therein forming a plurality of exhaust paths 78 communicating openings 56, 58 on the underside of plate 54. The bends 74 are brazed to plate 54 at contact points therewith and bends 76 are held against cover 36. The fin 72 has reversely struck tabs 80, 81 therein formed at spaced points along the length of each fin to form a reverse flow path along paths 78 between openings 56, 58 to produce substantial turbulence for improved transfer of exhaust heat to the fin 72 and hence to the plate 54. The fin 72 may be formed of 0.009 inch thick 410 stainless steel material.

Figure 6:
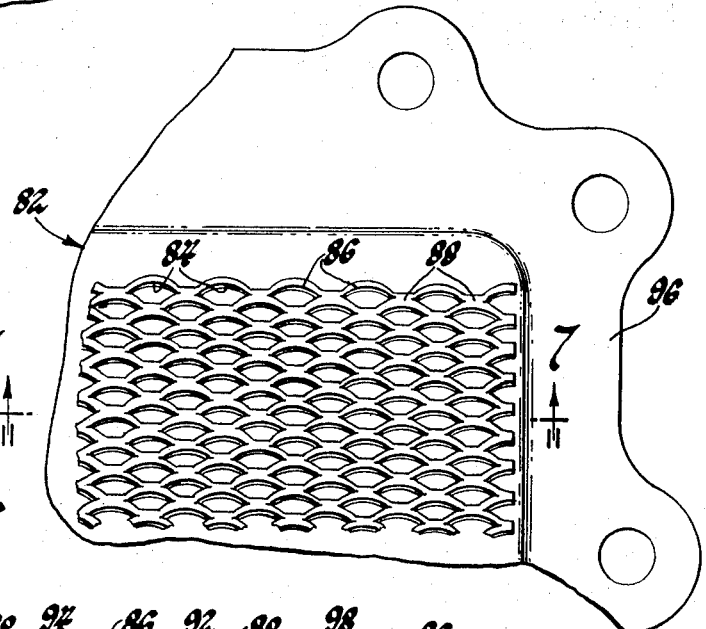
FIG. 6 is a fragmentary top elevational view of a second embodiment of the invention showing an expanded metal grid type fuel droplet retainer.

Referring now to the embodiment of the invention illustrated in FIG. 6, a modified retainer 82 is illustrated in the form of an expanded metal plate having a plurality of open cells or pockets 84 therein joined by longitudinal wall segments 86 and transverse wall segments 88. Edge segments 90 of the longitudinal wall segments 86 and edge segments 92 of the wall segments 88 are located in engagement with the upper surface 94 of a plate 96 like plate 54 in the first embodiment. These edge segments 90, 92 are connected to the upper surface of the plate 96 by accumulated spots 98, 100 of a layer 102 of brazing material for example copper as set forth in the first embodiment to secure the expanded metal retainer 82 in close juxtaposed relationship with the inner surface of the plate 96.

The size of each of the cells 84 is selected to avoid capillary action that would undesirably hold liquid fuel droplets on the inner surface of the plate 96. The cells 84 are also sized to produce a surface configuration on the plate 96 that will intercept a fuel droplet impinged thereagainst from a vertical riser bore tube 104 in an inlet manifold 106 like manifold 10 of the first embodiment to prevent the liquid droplets from flowing off of the plate. The bonding of the expanded metal retainer 82 to the heat transfer plate 96 will result in an operating temperature at all exposed surfaces of the retainer so that liquid droplets that impinge thereagainst will evaporate uniformly thereagainst and flow to the engine cylinders in vapor form. Since the plate 96 and retainer 82 have substantially the same operating temperature because of the above-described bond therebetween, the exposed surface of the retainer 82 will not have any cold spots on which liquid fuel can accumulate by condensation.

Furthermore, because of the formed wall segments 86, 88 in the retainer 82, liquid fuel will not be blown off the plate 96 to accumulate in liquid pockets on the outer periphery of the inner surface thereof in a manner that might undesirably prevent the passage of fuel into engine cylinders during a cold start phase of operation.

Figure 5:
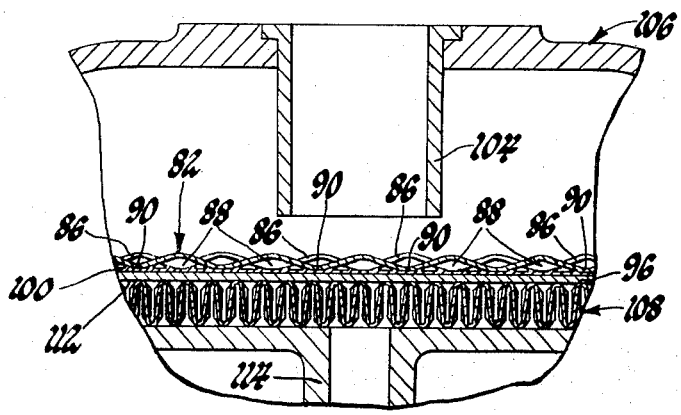
FIG. 5 is a vertical sectional view of an inlet manifold including another embodiment of the invention.
Figure 7:
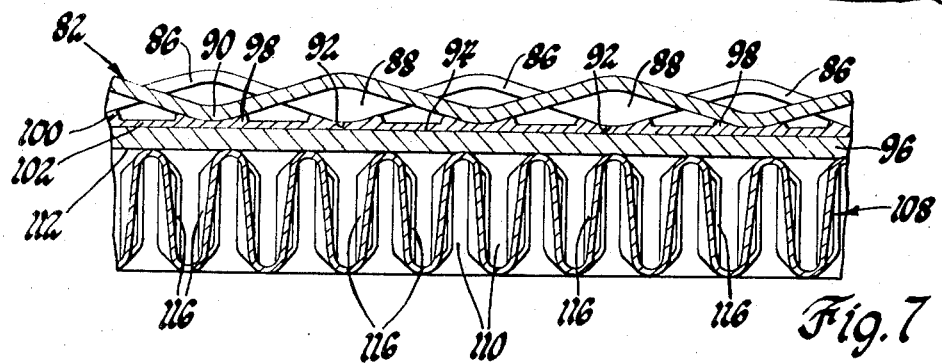
FIG. 7 is an enlarged vertical sectional view taken along line 7—7 of FIG. 6 looking in the direction of the arrows.

As in the embodiment of FIGS. 1–4, the embodiment of FIGS. 5–7 has a corrugated fin 108 bonded to the underside of plate 96 to form parallel exhaust paths 110 with an exhaust crossover passage 112 leading to an exhaust pipe 114. The fin 108 is bent and perforated by spaced tabs 116 as in the case of the first embodiment to produce the same resultant quick heat-up of plate 96.

While the embodiments of the present invention, as herein disclosed, constitute a preferred form, it is to be understood that other forms might be adopted.

What is claimed is:

1. In a quick heat manifold assembly of the type having a vertical riser bore for supplying an air-fuel mixture from a carburetor to an induction plenum which communicates with manifold runners for supply of air-fuel mixture to engine cylinders and wherein the manifold includes an exhaust heat crossover passage, the improvement comprising: means defining an opening in the manifold between the induction plenum and the crossover passage, a heat exchanger unit including means thereon for sealing the opening between the induction plenum and the exhaust crossover, said unit including a flat sheet metal plate of thermally conductive material located immediately below said induction plenum and including a planar extent extending beyond the cross sectional flow area of the vertical riser bores, a corrugated fin secured to the underside of said plate within said crossover passage to define a plurality of exhaust flow passes across the outer face of said plate, said corrugated fin having a plurality of bends therein having the length thereof in contact with the outer face of said plate, means for bonding said fin bends to the outer side of said plate, a fuel droplet retainer on the inlet side of said plate extending across the full planar extent thereof including a plurality of open cells therein sized to prevent capillary action, each of said cells having sidewall segments thereon in engagement with the inner face of said plate, means bonding at least 70 percent of the engaged segments of said sidewalls to said inner face of said plate to define a limited intercommunication between each of said cells, said sidewall segments blocking direct flow of fuel droplets intercepted on said retainer and restricting flow thereof from the point of contact to the outer perimeter of the plate to reduce accumulation of liquid fuel around the perimeter of said plate, said means for bonding said retainer to said plate having a thermal conductivity greater than that of said plate to cause a reduced temperature differential between said retainer and said plate whereby fuel droplets intercepted by said retainer and plate prior to passage into the engine cylinders are evaporated uniformly upon contact therewith and whereby the retainer and plate will be uniformly heated to prevent cold spots therein on which fuel can be retained by condensation.

2. In a quick heat manifold assembly of the type having a vertical riser bore for supplying an air-fuel mixture to an induction plenum in communication with manifold runners for supply of air-fuel mixture to engine cylinders and an exhaust heat crossover passageway, the improvement comprising: means forming an opening between the induction passage and the exhaust crossover passage, means for closing said opening including a flat sheet metal plate of thermally conductive material having a planar extent greater than the cross sectional flow area of the riser bore, said plate including a flanged perimeter thereon, means securing said perimeter to the intake manifold, a screen on the inner face of said plate extending to the peripheral flange thereon for intercepting fuel droplets and retaining said fuel droplets on the inner surface of said plate for a predetermined retention period to evaporate liquid fuel particles prior to passage thereof into the engine cylinders, said screen having a plurality of cells formed therein sized to prevent capillary action and each having sidewall segments therearound crossed at spaced points, said screen having portions of each of said sidewall segments in engagement with the inner surface of said plate, means for bonding the engaged sections of said sidewall segments to said plate to prevent direct intercommunication therebetween for blocking direct flow of fuel droplets from the center of said plate to the flanged perimeter thereof, said means for bonding said segments to said plate having a thermal conductance great enough to maintain the temperature of the screen and the plate to reduce cold spots thereacross and condensation of fuel thereon whereby fuel droplets are uniformly evaporated to direct a positive supply of vaporized fuel to engine cylinders during cold start operation.

3. In a quick heat inlet manifold of the type including a vertical riser bore adapted to be connected to a carburetor for supplying an air-fuel mixture to an engine having a riser tube in the bore for directing the air-fuel mixture downwardly within an induction plenum connected to runners for directing the air-fuel mixture to engine cylinders and wherein the manifold includes an exhaust crossover passageway the improvement comprising: means defining a bottom opening in the floor of the induction plenum, a sandwiched heat exchanger closing said opening including a heat transfer plate with an inlet side and an exhaust side, means for sealing said heat transfer plate with respect to the manifold to separate the induction plenum from the exhaust crossover passage, a plurality of corrugated fins having bends thereon in engagement with an exhaust side of said plate, means for bonding said bends to said plate to define a plurality of separate exhaust flow passes, means for communicating said exhaust flow passes with the exhaust crossover passage to heat the plate during cold engine start, a fuel droplet retainer connected to the inlet side of said heat transfer plate, said retainer having a plurality of deformed segments thereon defining a plurality of separate cells on the inlet side of said plate sized to prevent capillary action and for preventing flow of fuel droplets impinged thereagainst from a vertical riser tube, each of said deformed segments having a portion thereof in engagement with the inlet side of said heat transfer plate defining a portion of the perimeter of each of said cells, means for bonding said engaged portions of said deformed segments to said plate, said deformed segments having a maximum vertical distance with respect to the inlet side of said heat transfer plate no greater than three times the thickness of said heat transfer plate, said means for bonding said deformed segment portions to the inlet side of said plate having a thermal conductance great enough to cause said retainer and said plate to have a uniform temperature to prevent cold spots for condensation of fuel droplets on the inlet side of said plate, said bonded portions of said retainer serving to prevent blow off of fuel droplets from the planar extent of said plate and accumulation thereof within the inlet plenum thereby to improve cold start engine performance.

* * * * *